United States Patent [19]

Anderson

[11] Patent Number: 5,483,307
[45] Date of Patent: Jan. 9, 1996

[54] WIDE FIELD OF VIEW HEAD-MOUNTED DISPLAY

[75] Inventor: Douglas W. Anderson, Richardson, Tex.

[73] Assignee: Texas Instruments, Inc., Dallas, Tex.

[21] Appl. No.: 314,977

[22] Filed: Sep. 29, 1994

[51] Int. Cl.⁶ .................................................. G02B 27/10
[52] U.S. Cl. ........................... 353/98; 359/630; 359/631; 353/28
[58] Field of Search ................................ 353/28, 30, 98, 353/99, 11; 359/630, 631, 633, 629; 348/115; 345/7, 8

[56] References Cited

U.S. PATENT DOCUMENTS

| | | | |
|---|---|---|---|
| 3,549,803 | 12/1970 | Becht et al. | 359/631 |
| 4,383,740 | 5/1983 | Bordorsky | 359/631 |
| 4,859,030 | 8/1989 | Rotier | 359/631 |
| 4,969,714 | 11/1990 | Fournier, Jr. et al. | 359/630 |
| 5,164,848 | 11/1992 | Firth et al. | 359/13 |
| 5,184,250 | 2/1993 | Lacroix | 359/633 |
| 5,384,654 | 1/1995 | Iba | 359/630 |

FOREIGN PATENT DOCUMENTS 94018596  8/1994  WIPO ................................. 359/630

Primary Examiner—William C. Dowling
Attorney, Agent, or Firm—Julie L. Reed; Richard L. Donaldson; Rene E. Grossman

[57] ABSTRACT

A head-mounted display (10). A spatial light modulator (12) generates the image to be viewed. A projection lens (14) projects the image to a rear projection screen (16), which diffuses the image to accommodate the spacing and size of the viewer's eyes. The image is reflected by a beam splitter (17) to a curved reflector (18) in front of the viewer's eyes. The reflector (18) reflects the image through the beam splitter (17) in parallel rays so that the image appears to be distant, and also magnifies the image to provide a wide field of view.

13 Claims, 2 Drawing Sheets

WIDE FIELD OF VIEW HEAD-MOUNTED DISPLAY

TECHNICAL FIELD OF THE INVENTION

This invention relates to image display devices, and more particularly to a head-mounted display for a spatial light modulator.

BACKGROUND OF THE INVENTION

Spatial light modulators (SLMs) are commonly used for image display applications. In general, an SLM is an array of pixels, which are individually addressable, usually with electronic signals. Many SLMs are binary, having an addressing scheme that switches the pixels to either to an "on" or an "off" state to form the image. Various modulation and integration schemes are used to provide greyscale images.

One type of SLM is a digital micro-mirror device (DMD), sometimes referred to as a deformable mirror device. The DMD has an array of hundreds or thousands of tiny tilting mirrors, each of which represents one pixel. To permit the mirrors to tilt, each is attached to one or more hinges mounted on support posts, and spaced by means of an air gap over underlying control circuitry. The control circuitry provides electrostatic forces, which cause each mirror to selectively tilt. For display applications, image data is loaded to the DMD, and in accordance with the data, light is selectively reflected or not reflected from each mirror to an image plane.

An advantage of SLMs is that they can be made very small, and are far less bulky than older types of display devices, such as those that use a cathode ray tube. This permits the development of smaller display systems, with the image being projected from the SLM to a screen of the desired size.

SUMMARY OF THE INVENTION

One aspect of the invention is a head mounted display. A spatial light modulator generates images by reflecting, transmitting, or generating the image as a beam of light. A projection lens receives the beam of light from the spatial light modulator and projects that beam of light to a rear projection screen. The projection screen receives the projected beam of light and provides the images on its output surface. The projection screen is both transmissive and diffusive of the beam of light, with the diffusion providing a larger cone angle of the image so as to accommodate the size and spacing of the viewer's eyes. A beam splitter is in the path of the beam of light from said projection screen, and delivers some light to a reflector, which reflects and magnifies the image to the viewer such that said image appears to be distant with respect to said viewer.

An advantage of the invention is that it provides a head-mounted display that is compact and comfortable, both in terms of wearability and visual perception. The display has the wide field of view necessary for realistic simulation and entertainment applications.

More particularly, there are advantages resulting from the biocular design of the invention (both of the user's eyes use a common optical system). This biocular design is in contrast to devices such as binoculars, in which each eye has its own optical system. One result of the biocular design is decreased cost in that only one spatial light modulator need be used. A further result is increased comfort for the viewer in terms of more relaxed control of the position of the eyes with respect to the system. Also, the biocular design is inherently aligned, whereas a binocular system requires alignment of the two optical systems.

DETAILED DESCRIPTION OF THE INVENTION

For purpose of example, the following description is in terms of display systems whose spatial light modulators (SLMs) are digital micro-mirror devices (DMDs). However, the same concepts apply to display systems that use other types of SLMs. For example, a head-mounted display system having an array of liquid crystal pixels instead of a DMD array could be devised with appropriate modifications to the systems described below. Any SLM is suitable so long as it has a compact size and has the ability to generate an image that can be projected as a beam along a light path to a screen.

Figure 1:
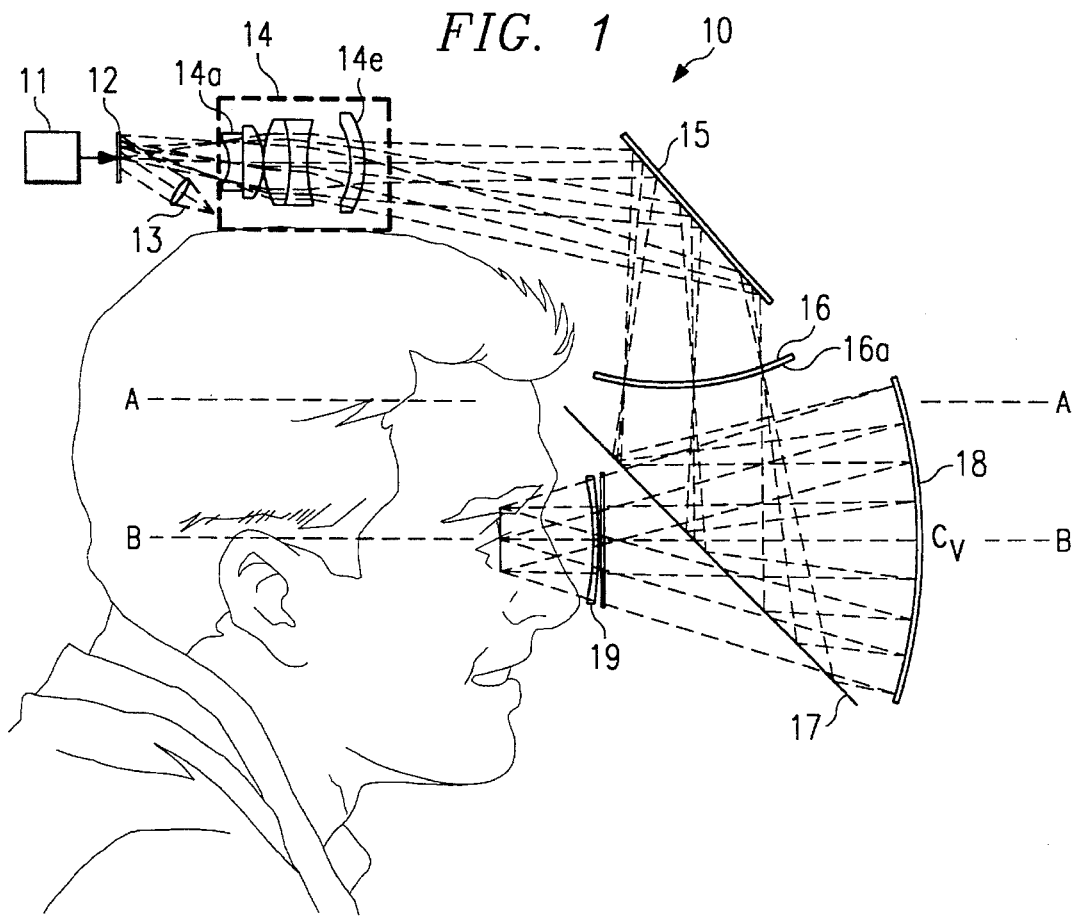
FIG. 1 is a side view of a head-mounted display in accordance with the invention.

FIG. 1 illustrates a head-mounted display 10 in accordance with the invention. Only the internal components are shown; in practical application, these components would be contained within a housing (not shown) having some means of securing the display 10 to the wearer's head.

Display 10 includes a data input unit 11, which contains various circuitry for delivering image data to the DMD 12. This circuitry may include data processing, formatting and frame memory circuitry, which are used to provide data to the DMD 12 in proper format. This type of circuitry is described in detail in patents directed to other types of DMD-based display systems, such as projection display systems. Examples of such patents are U.S. Pat. No. 5,079,544, entitled "Standard Independent Digitized Video System", and in U.S. patent Ser. No. 08/146,385, entitled "DMD Display System". Each of these patents is assigned to Texas Instruments Incorporated, and each is incorporated by reference herein. It is also possible that data input unit 11 could be simply a data input interface and a frame memory, with all processing and formatting having been performed externally to display 10 and the image data delivered to display 10 via a communications link (not shown).

A light source 13 provides light incident on the reflective surfaces of DMD 12. Light source 13 can be a small incandescent bulb, or could be an array of light emitting diodes. In one embodiment, the light is projected from off-axis with respect to the DMD 12, using a technique known as Kohler illumination. For color displays, light source 13 could provide several colors, switchable within each image frame period, so as to provide sequentially colored images that are integrated by the viewer into the desired colors. If some other type of SLM is used instead of a DMD, display 10 is easily modified so as to include whatever other light source is appropriate.

DMD 12 generates an image on its reflective surface and imposes the image on the beam provided by light source 13. As stated above, instead of a DMD 12, other types of SLMs could be used. For purposes of this description, regardless of whether the SLM reflects, transmits, or generates light, the common characteristic is that it generates images imposed on a beam of light.

A projection lens 14 relays the image, via a fold mirror 15, to a rear projection screen 16. As explained below, projection lens 14 is configured so as to provide a magnified image that corresponds to the size of screen 16. Thus, like other projections lenses 14, the primary function of projection lens 14 is to convert the image on DMD 12 to a distant real image on screen 16, with a minimum of aberration. Experimentation has indicated that a set of five lenses, as illustrated in FIG. 1, is suitable for this purpose. Lens 14a has an aperture stop that is appropriate for the cone angle of the incoming beam. Lens 14e is a plastic asphere lens. A feature of projection lens 14 is that it accommodates the small cone angle of the image at DMD 12, as well as the fact that this angle decreases with magnification of the image that must occur to relay the image to screen 16.

Figure 2:
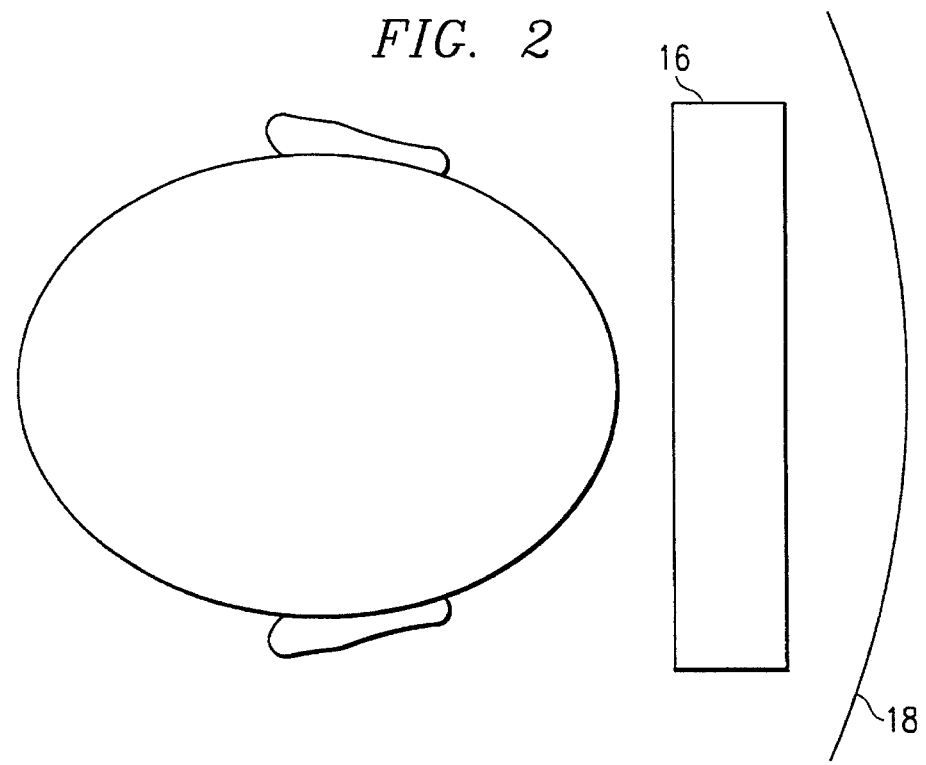
FIG. 2 is a top plan view of the head-mounted display of FIG. 1, along line A—A.

FIG. 2 is a top plan view of display 10, illustrating projection screen 16. As indicated, screen 16 is generally parallel to the viewer's horizontal field of view. Its length is related to the horizontal field of view, whereas its width is related to the vertical field of view. The dimensions of screen 16 are such that it provides a field of view having a desired width and height, after magnification by reflector 18. As explained below, the size of screen 16 is related to the magnification of reflector 18 in that reflector 18 permits screen 16 to be smaller.

Referring again to FIG. 1, projection screen 16 is made from a light-transmitting material, and is located at the image plane of the light projected by projection lens 14. Projection screen 16 is made from a diffusive material or has a diffusive coating. This diffusion converts the incoming beam, which has a slow f-number, into an outgoing beam with a faster f-number. In other words, screen 16 increases the cone angle to accommodate the size of the viewer's eyes and the spacing between them. In the simplest embodiments, screen 16 diffuses the image both horizontally (across the viewer's eyes and along the horizontal aspect of the image) and vertically. However, screen 16 could be designed so that the diffusion is primarily (or only) horizontal.

Projection screen 16 is slightly curved, with a concavity towards projection lens 14. This curvature compensates aberration and is related to the positive power of projection lens 14. In the embodiment of this description, screen 16 is concave both horizontally and vertically, but in this could vary depending on the optics of projection lens 14.

The beam of light on which the image is imposed from screen 16 reaches a beam splitter 17, where some of the light is reflected to a reflector 18 and some of the light is transmitted. Beam splitter 17 is a standard intensity-division device, which superposes the light paths from screen 16 to reflector 18 and from reflector 18 to the eyes. This arrangement is designed to balance a minimum of distortion in the viewing optics with loss of brightness.

Figure 3:
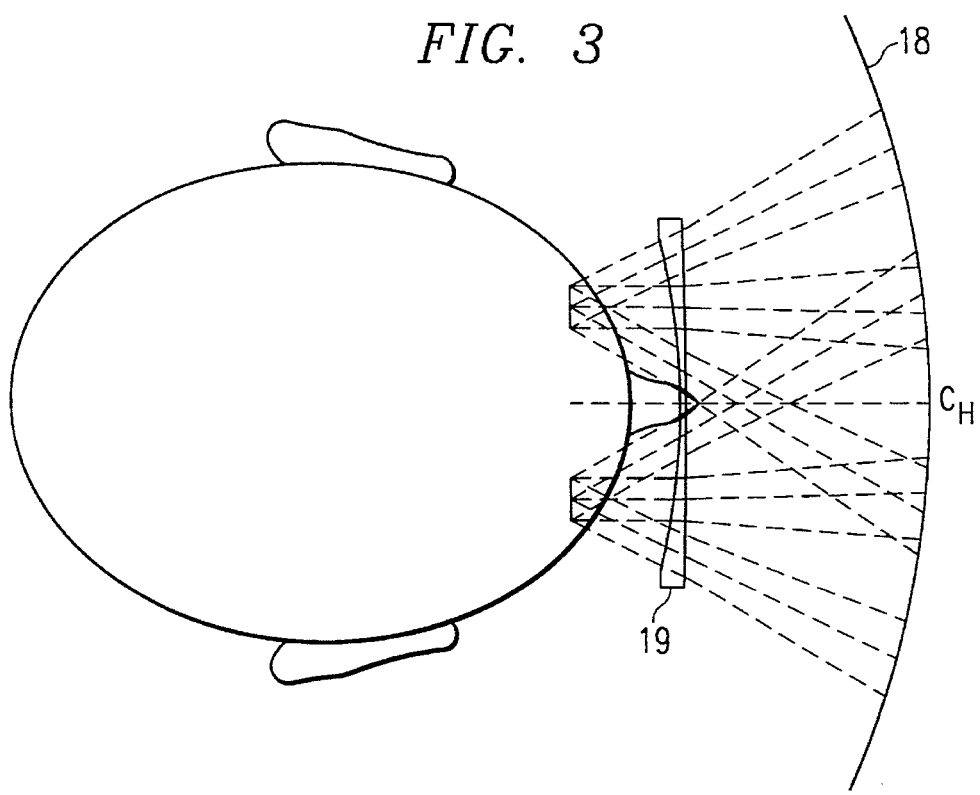
FIG. 3 is a top plan view of the head-mounted display of FIG. 1, along line B—B.

FIG. 3 is a plan view of display 10, illustrating the optical path of the image from reflector 18 to the viewer's eyes. Reflector 18 has a concavity with respect to the image (across the viewer's eyes), with the horizontal center of curvature, $C_H$, between the viewer's eyes.

Referring again to FIG. 1, reflector 18 also has a vertical concavity with respect to the image (up and down the field of view). The vertical center of curvature, $C_V$, is at the viewer's eyepoint.

As indicated by both FIGS. 1 and 3, the light reflected from reflector 18 is in substantially parallel rays. This gives the viewer the perception of an image at a distance. Depending on design specifications, the image may appear at infinity. Thus, as indicated above, reflector 18 magnifies the image so as to provide a large field of view, as well as enhances the comfort of the viewer by placing the image at infinity. A typical field of view of display 10 is 60 degrees horizontally and 30 degrees vertically.

Eyepiece 19 is a slightly negative lens. This negative power permits the size of reflector 18 to be smaller and permits the distance from reflector 18 to the eyes to be shorter than if no eyepiece 19 were present.

Figure 4:
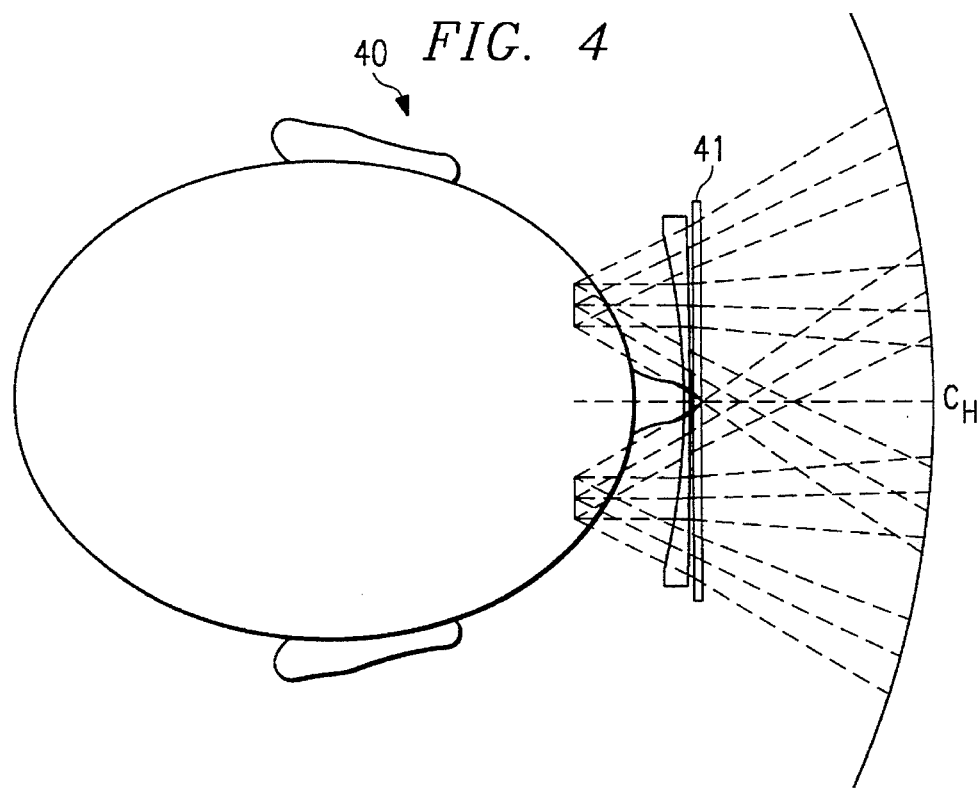
FIG. 4 is an enhanced embodiment of the head-mounted display.

FIG. 4 illustrates a stereoscopic display 40, which is an enhancement of display 10. FIG. 4 is the same view as FIG. 3, but with a shutter 41, which may be switched on and off synchronously with the provision of "right eye" and "left eye" images. The left and right images are displayed alternately in rapid succession and shutter 41 block's one eye's view while the other eye's view is being displayed. Various electronic shutters, such as those that alternately polarize light in one direction then another, may be used.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display to be worn on the head of a viewer, comprising:

a spatial light modulator for generating images as a beam of light;

a projection lens for receiving the beam of light from said spatial light modulator and for projecting that beam of light to a projection screen;

a projection screen for receiving the beam of light from said projecting lens and for providing said images on its output surface, said projection screen being both transmissive and diffusive of said beam of light;

a beam splitter in the path of the beam of light from said projection screen;

a reflector for receiving the beam of light reflected from said beam splitter and for reflecting said light to the viewer, such that said image appears to be distant with respect to said viewer;

an eyepiece in the path of said beam of light from said reflector to said viewer's eyes, said eyepiece having a negative lens.

2. The display of claim 1, further comprising a fold mirror in the path of the said beam of light from said projection lens to said projection screen.

3. The display of claim 1, further comprising a light source for providing illumination for said beam of light generated by said spatial light modulator.

4. The display of claim 1, wherein said spatial light modulator is a liquid crystal display.

5. The display of claim 1, wherein said spatial light modulator is a digital micro-mirror device.

6. The display of claim 1, wherein said reflector magnifies said image in the horizontal direction such that the field of view of said viewer is not less than 60 degrees horizontally.

7. The display of claim 1, wherein said reflector magnifies said image in the vertical direction such that the field of view of said viewer is not less than 30 degrees vertically.

8. The display of claim 1, wherein said reflector reflects said beam of light from said beam splitter in nearly parallel rays.

9. The display of claim 1, further comprising a shutter in the path of light from said viewer's eyes to said reflector for alternately blocking the left and right eye.

10. The display of claim 2, wherein said mirror magnifies said image with a horizontal concavity.

11. The display of claim 2, wherein said mirror magnifies said projection lens with a vertical concavity.

12. The display of claim 1, wherein said projection screen is horizontally concave.

13. The display of claim 1, wherein said projection screen is vertically concave.

* * * * *

UNITED STATES PATENT AND TRADEMARK OFFICE
CERTIFICATE OF CORRECTION

PATENT NO. : 5,483,307
DATED : January 9, 1996
INVENTOR(S) : Douglas W. Anderson It is certified that error appears in the above-indentified patent and that said Letters Patent is hereby corrected as shown below:

On the title page, item [73] Assignee:

change      "Texas Instruments, Inc., Dallas, Tex."

to      --Texas Instruments Incorporated Dallas, Tex.--

Signed and Sealed this

Second Day of December, 1997

Attest:

BRUCE LEHMAN

Attesting Officer     Commissioner of Patents and Trademarks